US009808991B2

(12) United States Patent
Tyler

(10) Patent No.: US 9,808,991 B2
(45) Date of Patent: Nov. 7, 2017

(54) METHOD AND APPARATUS FOR ADDITIVE MECHANICAL GROWTH OF TUBULAR STRUCTURES

(71) Applicant: Kenneth Tyler, Coeur d'Alene, ID (US)

(72) Inventor: Kenneth Tyler, Coeur d'Alene, ID (US)

(73) Assignee: CC3D LLC., Coeur d'Alene, ID (US)

( * ) Notice: Subject to any disclaimer, the term of this patent is extended or adjusted under 35 U.S.C. 154(b) by 226 days.

(21) Appl. No.: 14/810,437

(22) Filed: Jul. 27, 2015

(65) Prior Publication Data

US 2016/0031155 A1    Feb. 4, 2016

Related U.S. Application Data

(60) Provisional application No. 62/030,233, filed on Jul. 29, 2014.

(51) Int. Cl.
*B29C 64/209* (2017.01)
*B29C 67/00* (2017.01)
(Continued)

(52) U.S. Cl.
CPC .......... *B29C 67/0055* (2013.01); *B05D 7/222* (2013.01); *B29C 47/00* (2013.01); *B29C 47/0002* (2013.01); *B29C 64/165* (2017.08); *B29C 64/209* (2017.08); *B29C 64/232* (2017.08); *B29C 64/236* (2017.08); *B29C 70/382* (2013.01); *B29C 70/388* (2013.01); *B29C 70/522* (2013.01); *B29C 70/524* (2013.01); *B29C 70/525* (2013.01); *B33Y 10/00* (2014.12); *B33Y 30/00* (2014.12);
(Continued)

(58) Field of Classification Search
CPC .................................................. B29C 67/0022
USPC .................................. 425/11, 13, 60, 62, 63
See application file for complete search history.

(56) References Cited

U.S. PATENT DOCUMENTS 3,017,855 A * 1/1962 Ranker ............... B05B 13/0636
                                                       118/306
3,286,305 A   11/1966 Seckel
(Continued)

FOREIGN PATENT DOCUMENTS

DE    4102257 A1    7/1992
EP    2589481       11/2011
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Matthew Daniels
*Assistant Examiner* — Manley L Cummins, IV
(74) *Attorney, Agent, or Firm* — Ryan C. Stockett

(57) ABSTRACT

A method and apparatus is disclosed for additive manufacturing and three-dimensional printing, and specifically for extruding tubular objects. A print head extrudes a curable material into a tubular object, while simultaneously curing the tubular object and utilizing the interior of the cured portion of the tubular object for stabilizing and propelling the print head.

21 Claims, 12 Drawing Sheets

(51) Int. Cl.

| | | |
|---|---|---|
| B33Y 10/00 | (2015.01) | |
| B33Y 30/00 | (2015.01) | |
| B29C 70/52 | (2006.01) | |
| B29C 47/00 | (2006.01) | |
| B29C 70/38 | (2006.01) | |
| F16L 55/28 | (2006.01) | |
| F16L 55/32 | (2006.01) | |
| F16L 55/1645 | (2006.01) | |
| B05D 7/22 | (2006.01) | |
| B29C 64/232 | (2017.01) | |
| B29C 64/236 | (2017.01) | |
| B29C 64/165 | (2017.01) | |
| B29L 23/00 | (2006.01) | |
| B05B 13/06 | (2006.01) | |
| F16L 13/11 | (2006.01) | |
| B05B 12/14 | (2006.01) | |
| B05B 3/00 | (2006.01) | |
| B05D 1/02 | (2006.01) | |
| B29D 23/00 | (2006.01) | |

(52) U.S. Cl.
CPC .......... *F16L 55/1645* (2013.01); *F16L 55/28* (2013.01); *F16L 55/32* (2013.01); *B05B 3/001* (2013.01); *B05B 12/1481* (2013.01); *B05B 13/06* (2013.01); *B05B 13/0627* (2013.01); *B05B 13/0636* (2013.01); *B05D 1/02* (2013.01); *B05D 2254/04* (2013.01); *B29C 47/0004* (2013.01); *B29C 70/38* (2013.01); *B29D 23/001* (2013.01); *B29L 2023/00* (2013.01); *F16L 13/11* (2013.01)

(56) References Cited

U.S. PATENT DOCUMENTS

| | | | |
|---|---|---|---|
| 3,809,514 | A | 5/1974 | Nunez |
| 3,967,584 | A * | 7/1976 | Hasegawa ............... B05B 13/06 118/306 |
| 3,984,271 | A | 10/1976 | Gilbu |
| 3,993,726 | A | 11/1976 | Moyer |
| 4,092,950 | A * | 6/1978 | Hart .................... B05B 13/0636 118/306 |
| 4,643,940 | A | 2/1987 | Shaw et al. |
| 4,671,761 | A | 6/1987 | Adrian et al. |
| 4,780,072 | A * | 10/1988 | Burnette ............... B29C 33/485 118/205 |
| 4,822,548 | A | 4/1989 | Hempel |
| 4,851,065 | A | 7/1989 | Curtz |
| 4,938,167 | A * | 7/1990 | Mizuho .................. B08B 9/049 118/306 |
| 5,002,712 | A | 3/1991 | Goldmann et al. |
| 5,037,691 | A | 8/1991 | Medney et al. |
| 5,296,335 | A | 3/1994 | Thomas et al. |
| 5,340,433 | A | 8/1994 | Crump |
| 5,746,967 | A | 5/1998 | Hoy et al. |
| 5,866,058 | A | 2/1999 | Batchelder et al. |
| 5,936,861 | A | 8/1999 | Jang et al. |
| 6,153,034 | A | 11/2000 | Lipsker |
| 6,459,069 | B1 | 10/2002 | Rabinovich |
| 6,501,554 | B1 | 12/2002 | Hackney et al. |
| 6,934,600 | B2 | 8/2005 | Jang et al. |
| 7,726,256 | B1 * | 6/2010 | Weisenberg ........ B05B 13/0636 118/306 |
| 7,795,349 | B2 | 9/2010 | Bredt et al. |
| 8,221,669 | B2 | 7/2012 | Batchelder et al. |
| 8,402,911 | B1 * | 3/2013 | Weisenberg .......... F16L 55/265 104/138.2 |
| 9,057,474 | B2 * | 6/2015 | Choi ...................... F16H 48/10 |
| 9,101,967 | B2 * | 8/2015 | Farkavec ................ B08B 9/049 |
| 9,126,365 | B1 | 9/2015 | Mark et al. |
| 9,126,367 | B1 | 9/2015 | Mark et al. |
| 9,149,988 | B2 | 10/2015 | Mark et al. |
| 9,156,205 | B2 | 10/2015 | Mark et al. |
| 2002/0009935 | A1 | 1/2002 | Hsiao et al. |
| 2002/0062909 | A1 | 5/2002 | Jang et al. |
| 2002/0113331 | A1 | 8/2002 | Ihang et al. |
| 2002/0165304 | A1 | 11/2002 | Mulligan et al. |
| 2003/0044539 | A1 | 3/2003 | Oswald |
| 2003/0056870 | A1 | 3/2003 | Comb et al. |
| 2003/0160970 | A1 | 8/2003 | Basu et al. |
| 2003/0186042 | A1 | 10/2003 | Dunlap et al. |
| 2003/0236588 | A1 | 12/2003 | Jang et al. |
| 2005/0061422 | A1 | 3/2005 | Martin |
| 2005/0104257 | A1 | 5/2005 | Gu et al. |
| 2005/0109451 | A1 | 5/2005 | Hauber et al. |
| 2005/0230029 | A1 | 10/2005 | Vaidyanathan et al. |
| 2007/0003650 | A1 | 1/2007 | Schroeder |
| 2007/0228592 | A1 | 10/2007 | Dunn et al. |
| 2008/0176092 | A1 | 7/2008 | Owens |
| 2009/0095410 | A1 | 4/2009 | Oldani |
| 2011/0032301 | A1 | 2/2011 | Fienup et al. |
| 2011/0143108 | A1 | 6/2011 | Fruth et al. |
| 2012/0060468 | A1 | 3/2012 | Dushku et al. |
| 2012/0231225 | A1 | 9/2012 | Mikulak et al. |
| 2012/0247655 | A1 | 10/2012 | Erb et al. |
| 2013/0164498 | A1 | 6/2013 | Langone et al. |
| 2013/0209600 | A1 | 8/2013 | Tow |
| 2013/0233471 | A1 | 9/2013 | Kappesser et al. |
| 2013/0337265 | A1 | 12/2013 | Farmer |
| 2014/0061974 | A1 | 3/2014 | Tyler |
| 2014/0159284 | A1 | 6/2014 | Leavitt |
| 2014/0270968 | A1 * | 9/2014 | Kiest, Jr. ................. B29B 13/08 405/184.2 |
| 2016/0031155 | A1 | 2/2016 | Tyler |

FOREIGN PATENT DOCUMENTS

| | | |
|---|---|---|
| KR | 100995983 B1 | 11/2010 |
| KR | 101172859 B1 | 8/2012 |
| WO | 2013017284 A2 | 2/2013 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

(56) References Cited

OTHER PUBLICATIONS

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).
International Search Report dated Oct. 13, 2016 for PCT/US2016/042908 to CC3D LLC filed Jul. 19, 2016.

\* cited by examiner

901

902

US 9,808,991 B2

METHOD AND APPARATUS FOR ADDITIVE MECHANICAL GROWTH OF TUBULAR STRUCTURES

BACKGROUND

Additive manufacturing and 3D printing methods and devices are expanding. Innovations are occurring in materials used, systems of delivery, and applications.

The most popular 3D printers are appliances about the size of a microwave. They are limited in a few ways. Typically, they can only print one material at a time, and the build size is small, less than a cubic foot.

Some additive manufacturing techniques utilize gantry systems or mechanical arms, which afford the ability to build larger objects. But these are still limited to the size and maneuverability of the system of delivery, the volume under the gantry system or the reach of the mechanical arm.

There is a desire to build larger objects utilizing additive manufacturing techniques. A new method and device are needed to build these objects, but also make the objects strong enough to support the increased forces resulting from the larger size.

BRIEF SUMMARY OF THE INVENTION

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

Enclosed are descriptions for a new method and apparatus for the extrusion of tubular objects. It affords the construction of large-scale objects with a boundless build area, by utilizing the product for support and eliminating the need for an external positioning system.

Certain embodiments utilize an extrusion method of additive manufacturing. For example, in certain embodiments, an extruder is placed inside a mobile print head that utilizes the cured extruded material as support. The print head may be linked to at least one material source. For example, the linkage between the print head and the at least one material source may be a hose. The length of the hose may allow for greater range of the print head. The hose may range from a few inches to hundreds of feet in length, allowing flexibility in size and applications.

In certain embodiments, a base station may be positioned at one end of the hose. The base station may include, for example, a host computer, power supply, and extrusion materials for building objects.

In certain embodiments, a print head may be situated at one end of the hose. The print head may be positioned at the end of the hose opposite the base station. The print head may comprise one or more nozzles for extruding at least one material and a means of stabilization and propulsion.

Extrusion materials travel through the hose to the print head, where they are extruded through the multiple nozzles. Certain embodiments of this disclosure have a plurality of nozzles, which may be configured, for example in a circular formation. In addition to a circle, nozzles may be arranged to form a rectangle, octagon, or square. Any polygonal formation of nozzles is envisioned. At least one material is extruded through the nozzles, forming a tubular shaped object, called an extrusion tube. The tube grows in length as the print head continues extruding material while moving in the opposite direction of the extrusion.

The print head includes a means of stabilization and propulsion relative to the extrusion tube. Instead of relying on an external means, such as a gantry system or a mechanical arm, the print head utilizes the extrusion tube to provide a foundation for stability and propulsion. Several methods are available, for example, including a motor and a series of wheels that grip the inside of the hardened extrusion tube. The wheels may propel the print head while simultaneously extruding material and creating the extrusion tube.

The print head may extrude through the one or more nozzles at the same rate, forming a straight extrusion tube. In certain embodiments, however the print head varies the extrusion rate of the nozzles, in order to create, for example, arcs, turns, and complicated objects. The materials extruded may comprise continuous composites, which provide added strength, allowing extrusion tubes to grow into free space opposed to gravity. This affords horizontal, inverted, and complex shaped extrusion tubes.

DETAILED DESCRIPTION OF THE INVENTION

Figure 1:
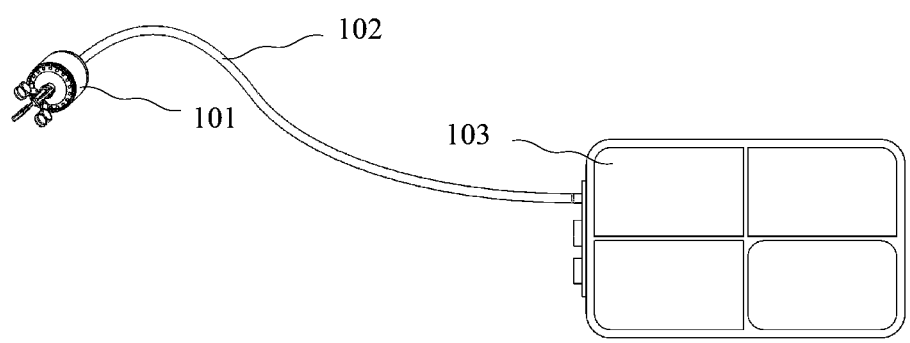
FIG. 1 is a perspective view of a print head connected to a base station by a hose.

Enclosed are embodiments for a new method and apparatus for additive manufacturing. See FIG. 1. The basic components of the apparatus may include, for example, a print head 101, a hose 102, and base station 103.

Figure 2A:
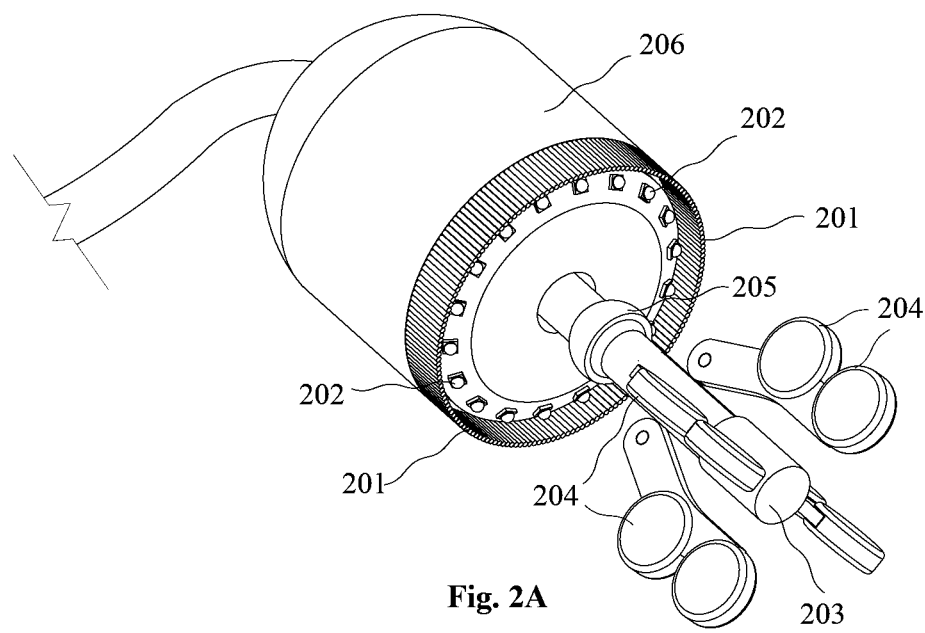
FIG. 2A is a perspective view of a print head with wheel system.
Figure 2B:
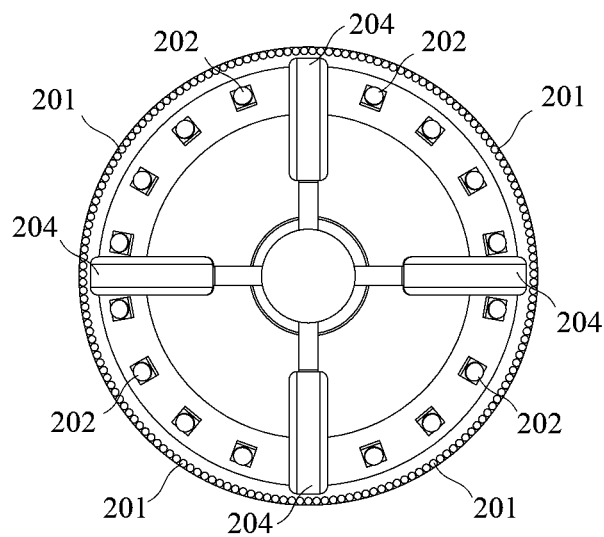
FIG. 2B is a bottom view of a print head with wheel system.

FIGS. 2A and 2B show an exemplary print head. The perimeter of the print head may comprise one or more individual nozzles 201, which extrude a curable matrix material. The curable matrix materials may reside in reservoirs or spools in the base station. The curable materials may include, for example, composites comprised of a solid strand reinforcement material and a curable liquid matrix material. Uniform curable matrix material without reinforced composites is also envisioned. Each nozzle extrudes the curable matrix material forming an individual path. In composite paths, the solid strand material is completely encased in the curable matrix material and is aligned coaxially with the path. Collectively, extrusions of all paths from the one or more nozzles form a cured tubular shape called an extrusion tube.

In certain embodiments, the print head comprises nozzles situated in a fixed direction. In still other embodiments, however, the print head may include articulating nozzles, capable of increasing or decreasing the diameter of an extrusion tube, as well as moving side to side to create semi tubes.

Certain embodiments of the present disclosure also have a means for curing the curable matrix material. For the purposes of this application, curing means the hardening of material. This could be, for example, a phase change from liquid to solid, the binding of solid powder particles, or the fusion of multiple solid materials into one. The means for curing may vary depending on the composition of the curable matrix material. In some instances, the means for curing might be inherent as a function of time or ambient temperature. Certain embodiments may utilize a photopolymer resin, which is curable by ultraviolet light. In these embodiments, the print head may include a UV light source illuminating out towards the extruded paths from one or more LED lights 202. This ultraviolet light cures the paths soon after extrusion from the one or more nozzles. An alternative embodiment of the means for curing may utilize heat in the case of thermoplastic material. Other alternative means of curing may include, for example, chemical curing agents, cooling, high-powered lasers, and sonication, which is the use of sound waves.

In embodiments extruding composite materials comprising a solid strand material encased within the curable matrix material, the print head also may include a means of feeding the solid strand material, such that the rate of feeding the solid strand material is coordinated with the rate of extruding the curable matrix material.

The print head includes a means of stabilization and propulsion. In certain embodiments, the print head may include, for example, a wheel system with a rotating wheelbase 203 and a series of wheels on tension loaded hinges 204. Additional components in the print head may include, for example, one or more motors for rotating the wheelbase, rotating each individual wheel, and maneuvering a multi-directional hinge 205 between the wheelbase and the print head housing. A ball joint is one example of a multi-directional hinge. Some embodiments of the print head contain a set of four wheels spaced, for example, approximately 90 degrees apart. Other embodiments may have more or less wheels as needed.

Alternative embodiments of the print head may include sensors to monitor operations. For example, the print head may include accelerometers or gyroscopes to measure orientation, thermometers to measure temperatures, and pressure sensors to maintain optimal material flow.

The print head's housing 206 may have a diameter equal to, or slightly smaller, than the exterior diameter of the extrusion tube. This configuration permits the extrusion of tubes adjacent to existing surfaces as well as other extrusion tubes. The print head may, for example, have a diameter of six inches, although those skilled in the art would understand that additional diameters may alternatively be implemented.

The perimeter of the print head may be equipped with a single ring-shaped nozzle or a plurality of nozzles forming a ring.

A hose 102 may extend from the top of the print head 101 and connect to the base station 103. The hose may be connected to the print head and the base station with, for example, rotor couplings. This connection allows the hose to twist as needed during operation.

The hose may be comprised, for example, of several lines between the print head and the base station: a power supply, an internal hose supplying curable matrix material, an internal hose feeding solid strand material, and electronic communication lines providing feedback to the host computer and allowing it to operate the components in the print head.

An alternative embodiment of the print head may have the hose running up through the bottom of the print head rather than out the top. In this embodiment, the length of the hose runs up through the extrusion tube to the print head.

Figure 3:
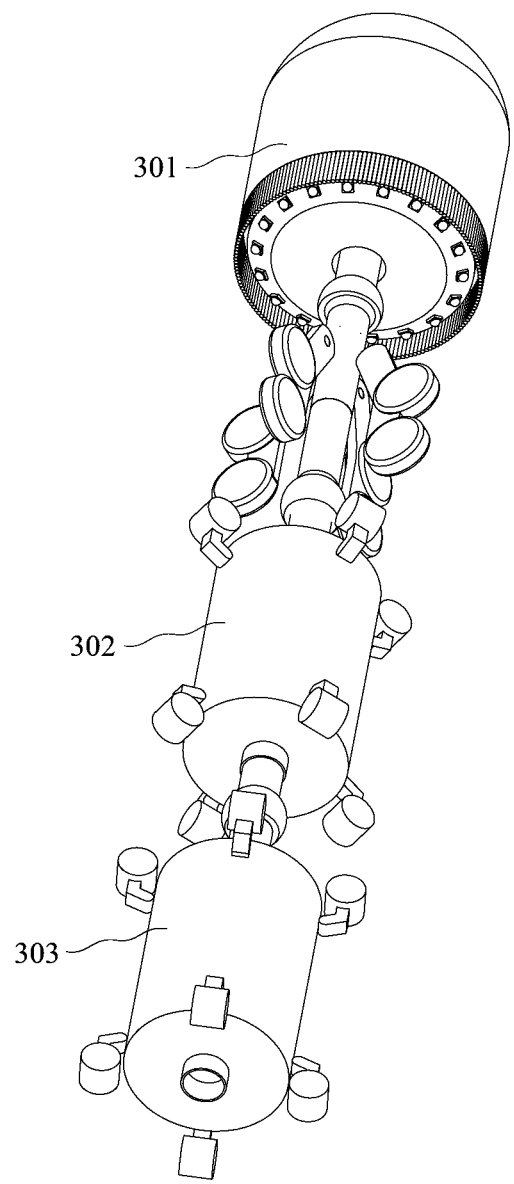
FIG. 3 is a perspective view of a print head with additional rolling modules.

Some embodiments may limit the need for a hose. Instead of materials residing in reservoirs or spools in the base station, they may be contained in the print head, or in housing connected to the print head. An alternative embodiment is shown in FIG. 3. This print head 301 shows two rolling modules 302, 303 attached to the print head. These modules may contain reservoirs for curable matrix material, spools of solid strand material, a power supply, and a host computer with remote control radio communication capability. These embodiments would not require a hose, and permit the apparatus to operate entirely autonomously.

The base station 103 may provide a power supply and house a host computer, a reservoir of curable matrix material, and one or more pumps for moving the material through the hose to the print head. In embodiments extruding composite materials, the base station may also include a supply of solid strand material and motors to feed it through the hose. In some embodiments, the base station may also include an air or water compressor for providing pressure in the extrusion tube.

The base station is designed to be mobile, so an operator of the apparatus may construct extrusion tubes on site. In some embodiments additional mobility may be desired, and the base station may then be equipped with its own means of mobility. See FIG. 12A for an example of a base station with caterpillar tracks 1201.

The host computer controls a variety of operations, including, for example, the extrusion rate of materials, the feed rates of solid materials, the means for curing, and the propulsion of the print head.

The host computer coordinates these activities to produce quality extrusion tubes with the aid of feedback from available sensors on the print head. In some embodiments, the host computer may control multiple print heads simultaneously.

This disclosure eliminates the need for the customary means of positioning a print head. As previously explained, known systems for positioning a print head typically use a gantry system or mechanical arm. Instead of using a gantry system or mechanical arm, the print head of the present disclosure comprises a means of stabilization and propulsion. The means stabilize the print head in position for extruding while also propelling the print head forward. Several alternative systems providing means of stabilization and propulsion are possible: wheel, pig, caterpillar, inchworm, screw, walking, wall press, or magnet. See FIG. 4.

As shown in FIG. 2A, a wheel system may extend from the bottom of the print head. Multiple sets of wheels may be connected to the print head via a shaft equipped with a multi-directional hinge. The wheels may be pressed against the inside of the extrusion tube, securing the print head in position. The wheels rotate in a coordinated manner, propelling the print head as it extrudes.

Figure 4:
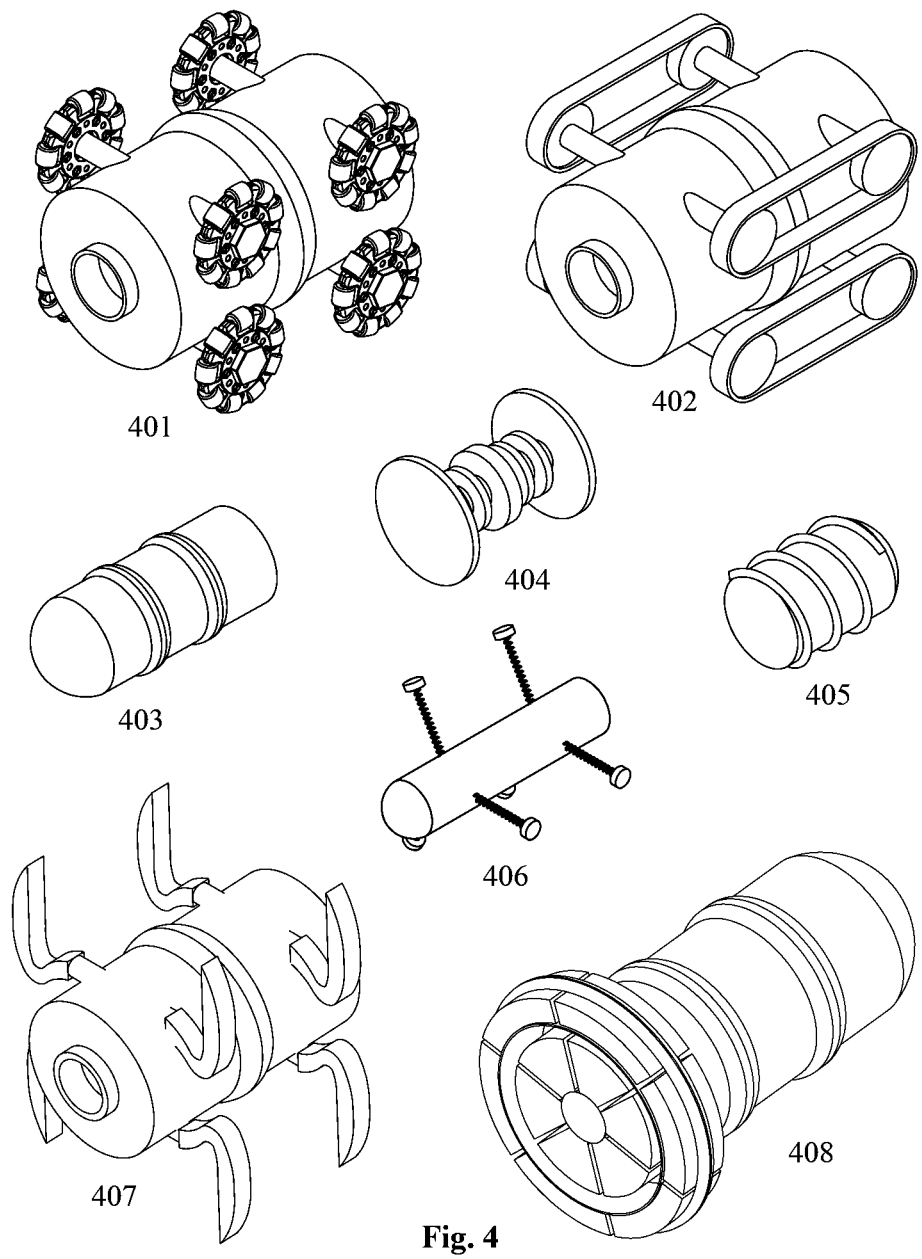
FIG. 4 provides perspective views of several means of stabilization and propulsion.

FIG. 4 depicts an embodiment of a wheel system 401. Caterpillar systems 402 function similarly to wheels systems, and simply replace the wheels with caterpillar tracks.

In some embodiments, it may be desirable to increase the strength of the wheel system in order to better stabilize and propel the print head. Multiple sets of wheels may be added in succession behind the first set. FIG. 3 shows a print head with two additional rolling modules 302, 303. Instead of these modules representing base station components as described above, each may be a functioning wheel system, capable of pressing the inside of the extrusion tube for stability and propelling the print head forward in a coordinated fashion.

A pig system 403 may utilize pneumatic or hydraulic pressure to propel the print head forward. The pig may be attached to the print head with a multi-directional hinge. It may function as a tight fitting plug inside the extrusion tube. Gas or liquid may be pumped into the extrusion tube, creating pressure to propel the print head forward. This embodiment requires the addition of compressors and pumps, and hoses supplying the gas or liquid to the extrusion tube cavity. The supply may come, for example, through a print head valve, the base station, or through a valve opening somewhere on the extrusion tube. As the extrusion tube grows, the controlled pressure builds in the tube, forcing the print head to move at the same rate as the rate of extrusion. A pig system may be desirable for large straight tubes.

Alternative means of stabilization and propulsion provide increased functionality for specific applications. The inchworm system 404 is useful for very small tubes, where the diameter might be impractical for a wheel system or other moving parts. The screw system 405 provides a rotation to the print head as it moves forward, which would create spiraling extrusion tubes. Wall press systems 407 provide a means of increased stability, which may be useful when printing extrusion tubes vertically and opposed to gravity. Walking systems 406 provide articulating legs that might better navigate complicated extrusion tubes. Magnet systems 408 place a magnet inside the extrusion tube, and propel the print head forward by introducing an electromagnetic field from an external source moving a long the extrusion tube. Magnetic systems may operate best in high-speed applications.

These means of propulsion are generally referred to as pipe crawlers, and are used to inspect existing pipes, or drill tunnels. Instead of a equipping these pipe crawlers with inspection sensors or drill bits, a print head may be attached via an articulating joint, creating a pipe crawler that stabilizes a print head and prints its own pipe to crawl through.

Figure 5:
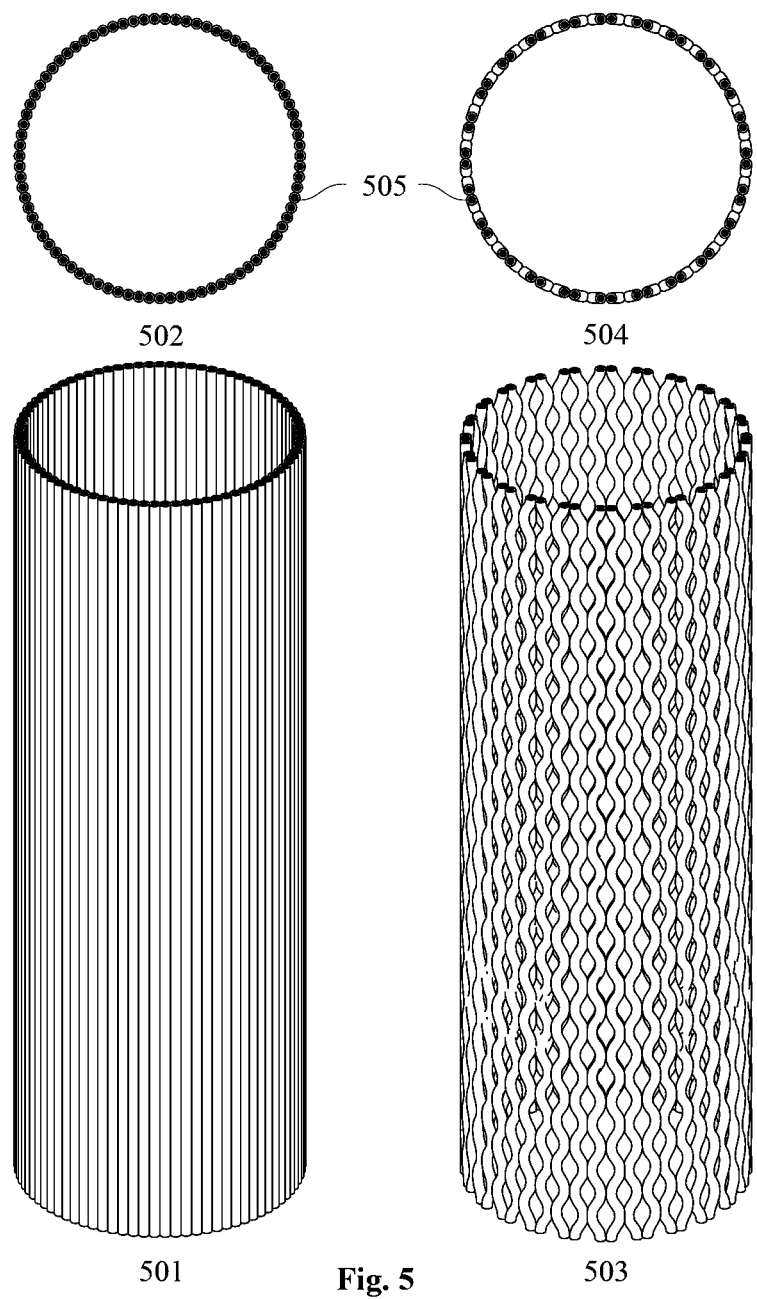
FIG. 5 shows perspective and cross section views of a straight extrusion tube and a mesh semi-tube.

See FIG. 5 for an example of a straight extrusion tube 501. To create an extrusion tube, the print head may extrude curable matrix material through each of the one or more nozzles at a coordinated rate. The extrusion tube is cured soon after extrusion, at a point between the nozzles and means of stabilization and propulsion. It is important that curing is done clear of the nozzles to prevent plugging the print head. The wheels 204 press out against the inside of the cured extrusion tube with enough force to stabilize the print head. As the tube extrudes, the wheels rotate at the same rate, lifting the print head. This procedure continues throughout the length of the extrusion tube, with the print head moving in coordination with the rate of extrusion, and continuously gripping the most recently cured portion of the extrusion tube.

Figure 6:
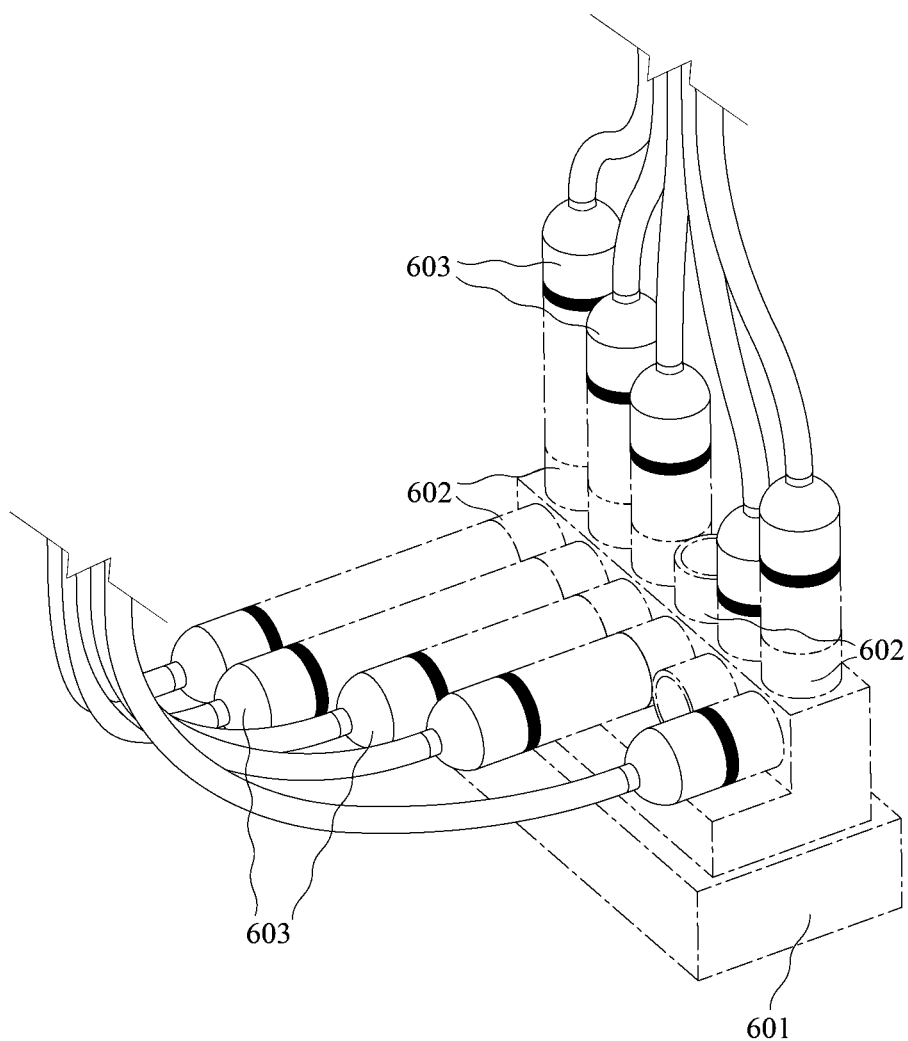
FIG. 6 is a perspective view of a starter piece with twelve anchors and ten print heads printing extrusion tubes.

The method of printing extrusion tubes begins on an anchor with a similar size and shape to the extrusion tube. FIG. 6 shows a starter piece 601 for anchoring extrusion tubes vertically or horizontally. This exemplary starter piece has twelve anchors 602, with ten print heads 603 utilizing ten of the anchors. The print heads' means of stabilization and propulsion are placed inside the anchors, which hold the print heads in place so that the perimeters of the print heads line up with the edges of the anchors. The initially extruded curable matrix material may attach directly to the edge of the anchors where it is cured. The printing process continues as if the anchor were simply an extension of the extrusion tube.

The anchors in FIG. 6 may be attached to a starter piece 601 that will be incorporated into a final product. The anchor may also be the end of another existing extrusion tube. In some embodiments, a temporary anchor may serve to start an extrusion tube, which is then manually cut away after the extrusion process is complete.

The present disclosure is directed to the creation of extrusion tubes comprising a curable matrix material, and extrusion tubes of composite materials comprising a curable matrix material and a solid strand reinforcement material. The curable matrix material may be stored in a reservoir in the base station. In some embodiments the curable matrix material may be stored in a reservoir attached directly to the print head. Envisioned curable matrix materials, for example, may include ultraviolet photopolymers or thermoplastics, although those skilled in the art will appreciate that additional curable matrix materials may be used.

Ultraviolet photopolymers are uniquely blended to cure under ultraviolet light. Photopolymers include, for example, acrylates, monomers, oligomers, bismaleimides, and thermosetting epoxies.

Thermoplastics are solid plastics that are heated to melt before extrusion. Thermoplastics include, for example, polylactic acid (PLA), acrylonitrile butadiene styrene (ABS), cellulose, polyether ether ketone (PEEK), polyetherimide (PEI), polyethylene terephthalate (PET), and nylon. Thermoplastics require a spool of material instead of a reservoir, and an alternative embodiment for the print head may include a heat source to melt the material prior to extrusion. In certain embodiments thermoplastics may be combined with a filler to form a heterogeneous composite. Envisioned fillers include, for example, ceramic powder, metal powder, sand, glass powder, and chopped fiber.

Alternative embodiments may utilize a laser sintering process, where the curable matrix material is a powder sprayed out of the nozzle. Powders provide a wide range of materials including the photopolymers and thermoplastics listed above, and also metals, alloys, ceramics.

Certain embodiments of the present disclosure extrude composite paths, utilizing at least two materials, a matrix of liquid curable material surrounding a solid strand material. In these embodiments, the solid materials are stored on spools either in the base station or attached to the print head. Examples of solid strand materials include cotton, hemp, jute, flax, ramie, rubber, sisal bagasse, ground wood, thermo mechanical pulp, bleached kraft, unbleached kraft, sulfite, silk wool, fur, spidroins, chrysotile, amosite, crocidolite, tremolite, anthophyllite, actinolite, metal, metal alloys, aramid, carbon fiber, carbon nanotube fiber, silicon carbide, fiberglass, petrochemical, or polymer. Those skilled in the art will understand that any solid strand material may be used, and may include tubular strands, meshes or fiber tows.

The composite may be any combination of photopolymer or thermoplastic with a solid strand. For example, one possible composite is an ultraviolet photopolymer comprising monomers combined with a solid strand of 3 k carbon fiber tow twisted every two inches. The photopolymer should have an appropriate viscosity to adhere to the carbon tow during extrusion. For some applications it may be desired to print some paths with photopolymer and others with thermoplastic. Any combination of the above-mentioned materials is envisioned.

In some embodiments of the present disclosure, the speed for printing composite paths is 450 inches per minute, but faster or slower speeds may be desirable depending on the application.

See FIG. 5 for an example section of a composite extrusion tube 501, and its cross-section 502. The solid strand material 505 may be completely encased within the path. Composite paths may be desirable, as they may provide strength to the finished product, and stability during the manufacturing process.

Paths may be comprised of several combinations of material. For example, some paths may be a carbon fiber solid strand material and a photopolymer resin as the curable matrix material. This combination provides strength to each path and the entire extrusion tube. Another embodiment of a path's composition may have a solid strand material of conductive metal encased in fiberglass. This path composition affords the ability to create extrusion tubes with conductive properties. Those skilled in the art would understand that other functional paths may be implemented.

Figure 7:
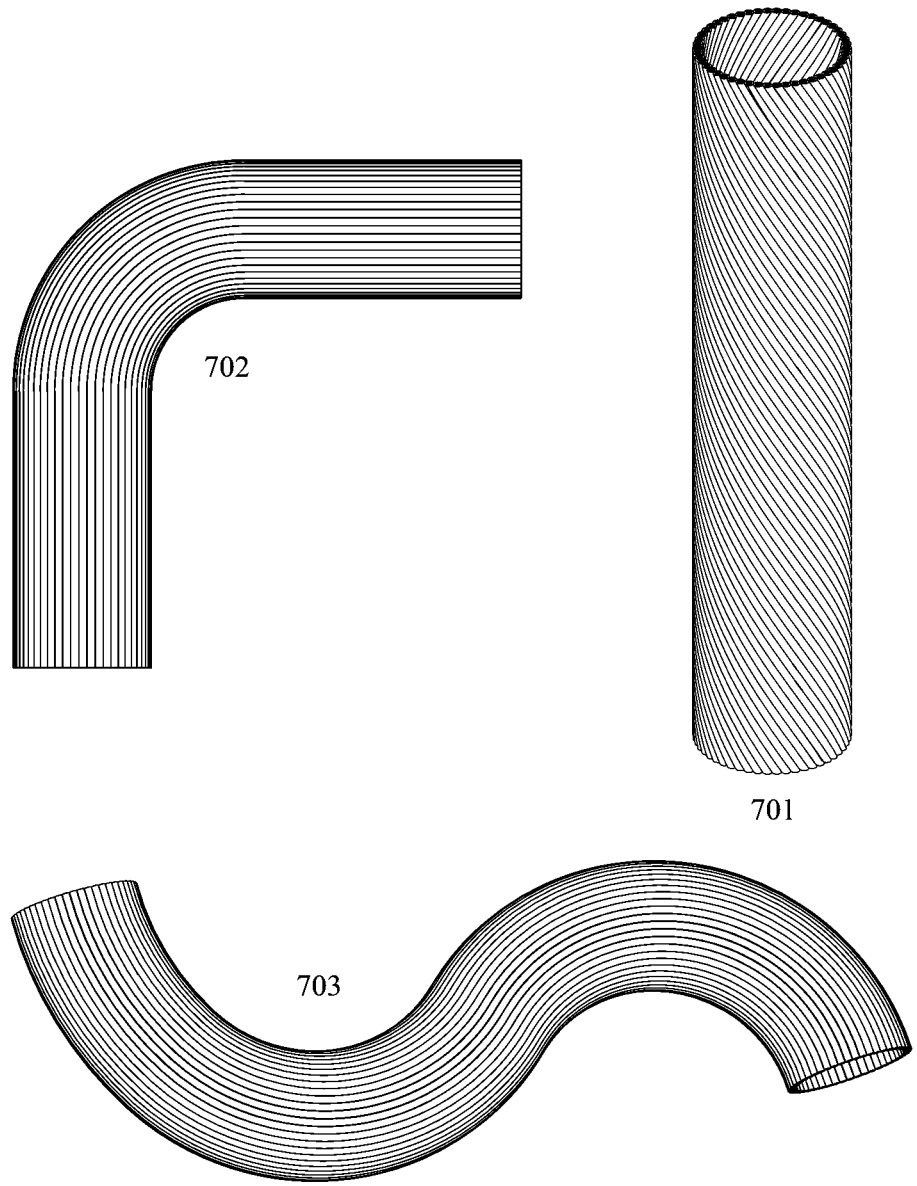
FIG. 7 is a perspective view of three alternative extrusion tube shapes.

The present disclosure affords the ability to make a wide variety of tubular shapes, including spirals, curves and angles. See FIG. 7.

The extrusion process performs in a similar way when creating a spiral path 701, but with the addition of a coordinated rotation between the means of propulsion and the print head. When using a wheel system for propulsion, a shaft 203 connecting the wheel system to the print head may spin continuously throughout the extrusion process. A spiral extrusion tube may supply even greater strength.

Composite extrusion tubes are strong enough to afford the printing of straight and spiral paths vertically, or in other directions. The print head may use the wheel system to grip the inside of the tube with enough force to stabilize it against gravitation forces regardless of the orientation; vertical, horizontal, inverted, or any other three-dimensional vector.

Extrusion tubes may also make arcs and turns. A simple example is the printing of a tube at a right angle 702. The print head moves vertically and then performs a 90-degree turn. During the turn, each nozzle extrudes at variable coordinated rates to accomplish the turn. For example, when making a left turn, the nozzles on the right side will extrude at a greater rate than those on the left. As the angle of the extrusion tube changes direction, the multi-directional hinge adjusts, allowing the wheels to grip the previous portion of the tube while the print head is extruding in a slightly altered direction. The multi-directional hinge may adjust accordingly to create a variety of angles, and produce complicated extrusion paths, such as an s-curve 703.

Figure 8:
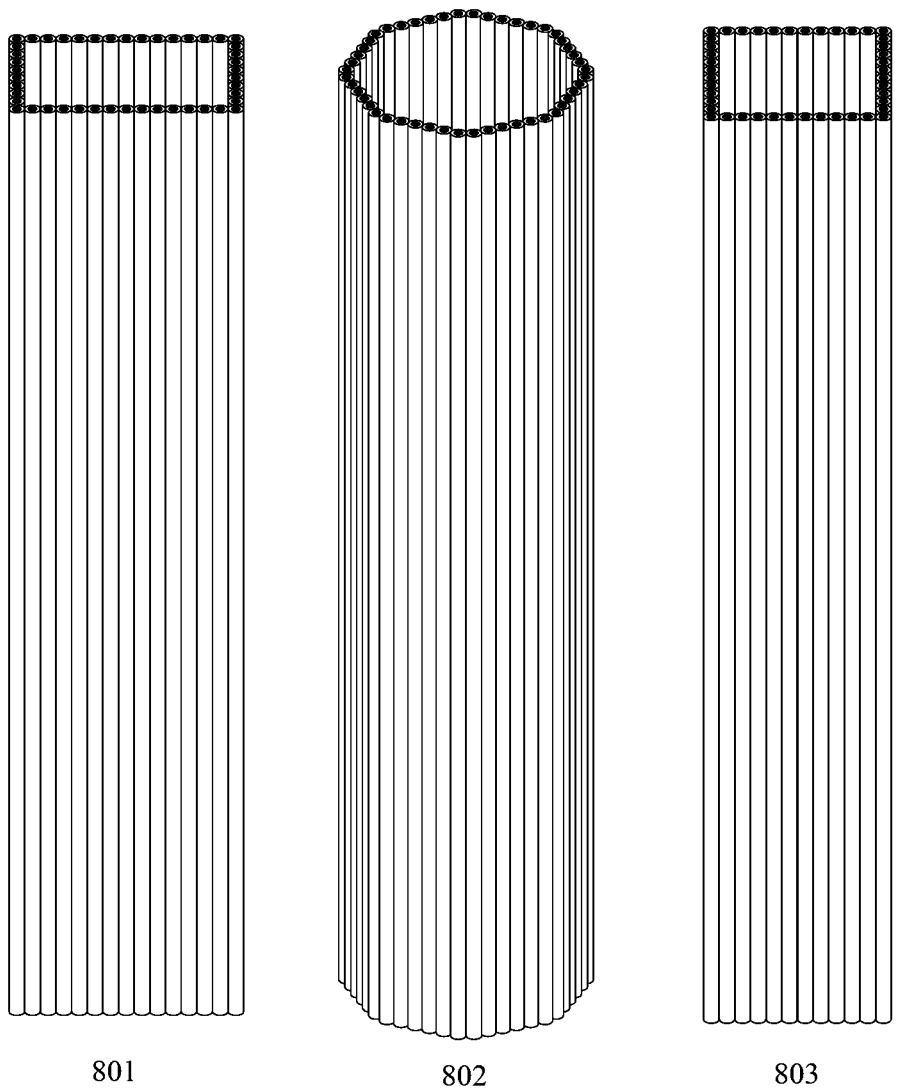
FIG. 8 is a perspective view of three extrusion tubes resulting from alternative nozzle configurations.

FIG. 8 shows a variety of extrusion tubes with different nozzle configurations. In addition to a circle, nozzles may be arranged to form a rectangle 801, octagon 802, or square 803. Any polygonal formation of nozzles is envisioned.

In some applications, it may be beneficial to cease extrusion of some nozzles during the formation of an extrusion tube for the formation of access holes or meshes. When an individual nozzle or group of adjacent nozzles stop and restart extruding while other nozzles extrude continuously, a hole will form in the extrusion tube. These holes may serve as access to the interior of the tube. A coordinated stop and start of various nozzles may form a mesh tube, requiring significantly less material to construct.

In an alternative embodiment, the print head may be comprised of articulating nozzles, capable of moving and rotating 360 degrees. This affords the ability for a single print head to extrude tubes of varying diameters, or cross-sectional areas for non-circular tubes. As the nozzles move towards or away from the central access of the print head, the diameter of the tube will decrease or increase.

Additionally, the nozzles may move from side to side, along the perimeter of the print head. This functionality may best be used when only some of the nozzles are extruding. See FIG. 5 for an example cross-section 504 utilizing only a portion of the nozzles in the print head. This creates a semi-tube, where there are gaps in between each path. If the nozzles alternate side to side, the paths connect, forming a mesh semi-tube 503. This embodiment may allow for the printing of extrusion tubes with less material and increased strength.

There are many practical applications for the mechanical growth of extrusion tubes. It provides the ability to print on site with relatively low equipment requirements, and in areas or ranges inaccessible to traditional additive manufacturing positioning systems. This method and apparatus is particularly useful for large-scale construction of buildings, bridges, and infrastructure, as well as water vessels and satellites in zero gravity. Several practical applications are listed below and those skilled in the art will appreciate a myriad of additional applications.

Figure 9:
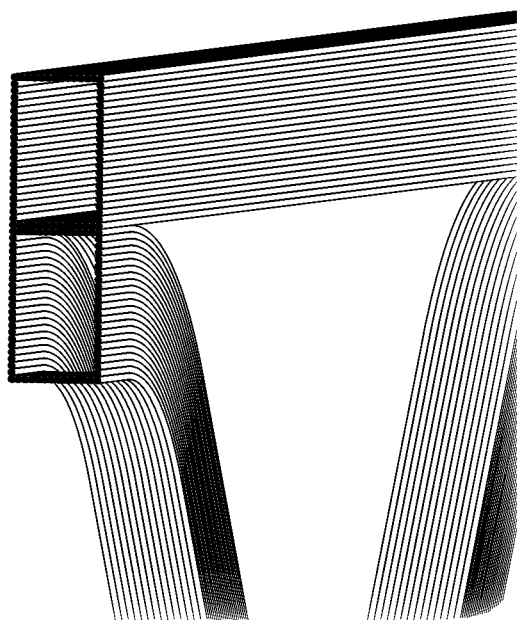
FIG. 9 shows a perspective view of a truss detail and a front view of a truss comprised of three rectangular extrusion tubes.
Figure 9:

FIG. 9 shows a front view of a truss comprising three rectangular extrusion tubes 902 and a detail view 901 of how the three tubes connect to form the truss. It is possible to build complex and coordinated shapes with multiple extrusion tubes. These shapes may be built on site and added to a building, or they may be embedded within the building itself.

Figure 10A:
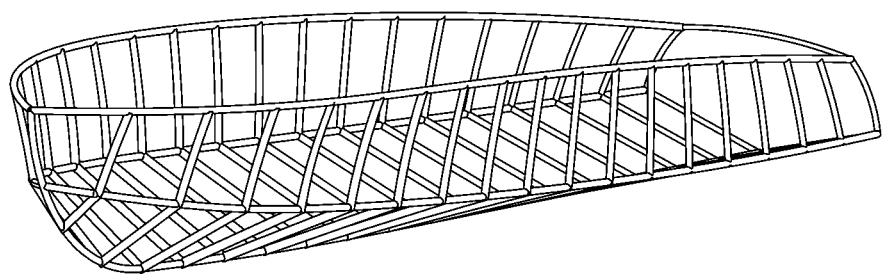
FIG. 10A is perspective view of a boat hull frame.
Figure 10B:
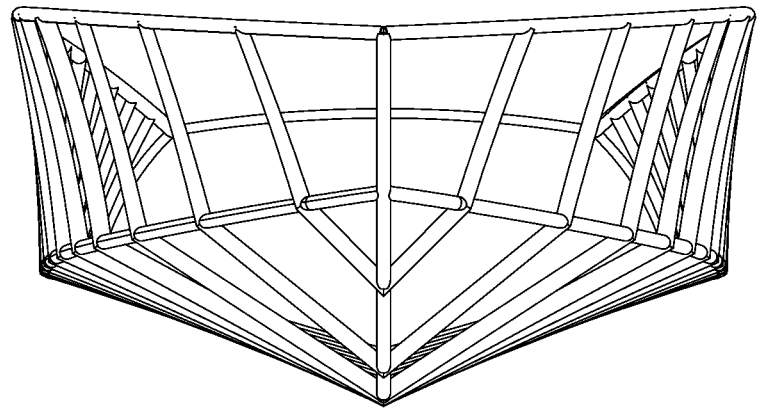
FIG. 10B is a front view of a boat hull frame.

FIGS. 10A and 10B show a boat hull frame created from multiple extrusion tubes. Because of the elimination of a remote positioning system, boat hulls of large size are capable. The hollow tubes provide an additional means of buoyancy to watercraft.

Figure 11:
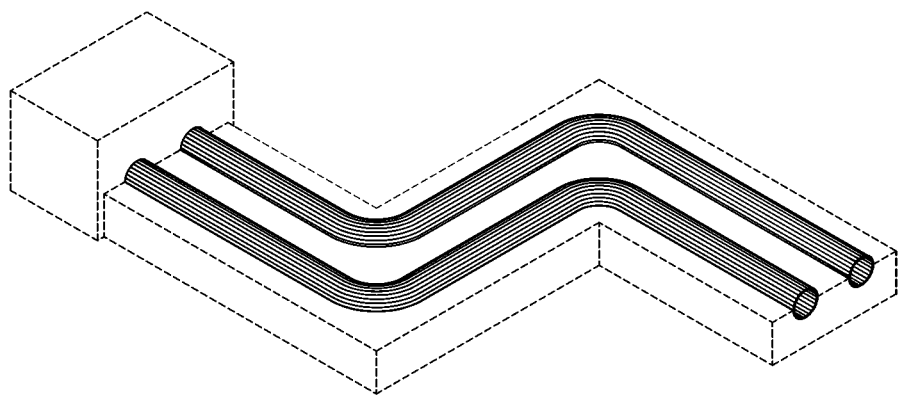
FIG. 11 is a perspective view of two extrusion tubes serving as infrastructure.

FIG. 11 shows an application for city infrastructure. Extrusion tubes of custom size and shape may serve as water, sewer, gas, or electric pipes.

Figure 12A:
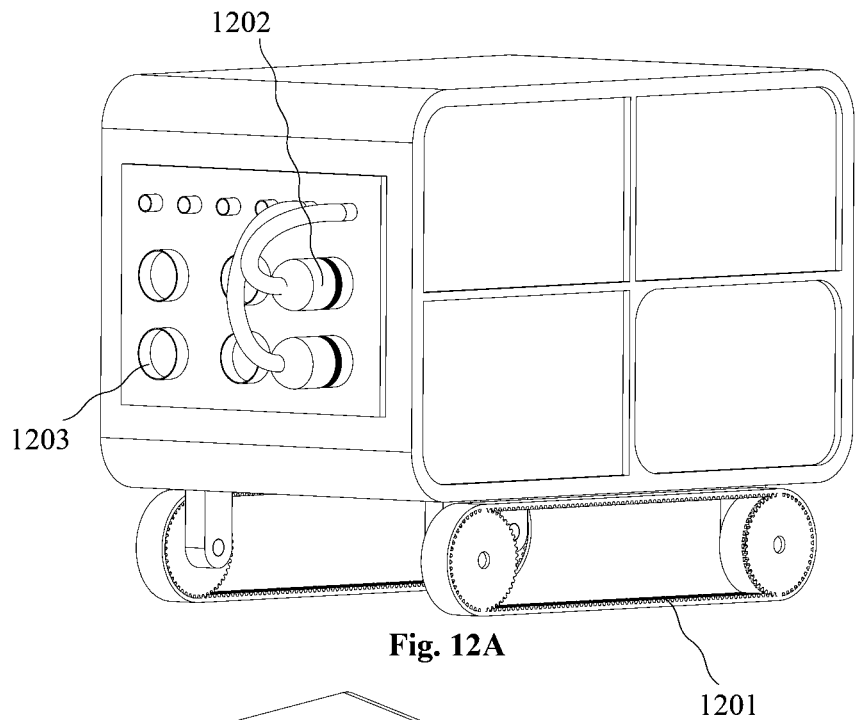
FIG. 12A is a perspective view of an alternative embodiment of a base station.

FIG. 12A shows an alternative embodiment of the base station. This example base station is equipped with a means of mobility, caterpillar tracks 1201, which may allow the base station to move relative to the needs of the desired product. Additionally, FIG. 12A depicts two print heads 1202 attached; however, it has the availability for six print heads, allowing the simultaneous printing of multiple extrusion tubes. The base station may also be equipped with anchors 1203 for starting extrusion tubes.

Figure 12B:
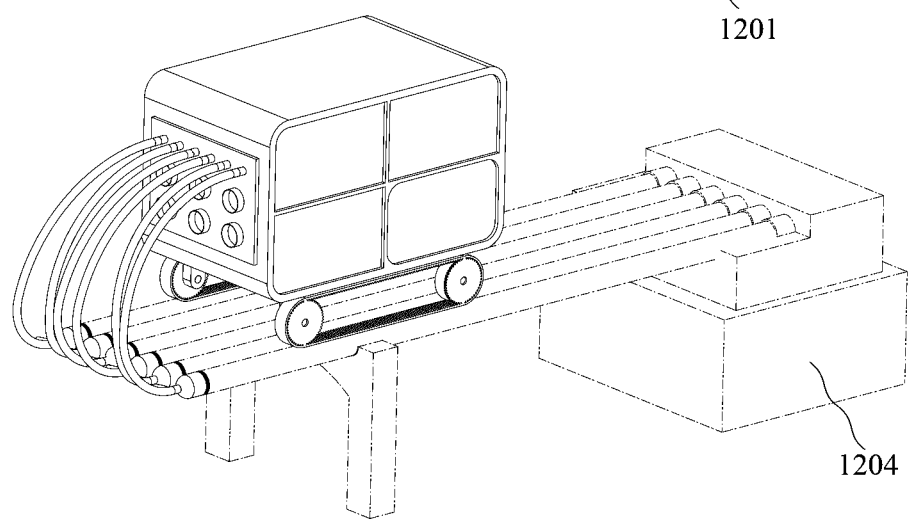
FIG. 12B is a perspective view of an alternative embodiment of a base station extruding six extrusion tubes from a starter piece.

FIG. 12B shows a potential application of this alternative embodiment. A starter piece 1204 supplies six anchors to start six contiguous extrusion tubes. As the tubes grow, the base station moves with it, providing a potentially limitless build space with a relatively small machine.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps. Accordingly, the disclosed embodiments are not limited to the above-described examples, but instead are defined by the appended claims in light of their full scope of equivalents.

What is claimed is:

1. An additive manufacturing system, comprising:
a head having at least one nozzle that discharges a tubular shaped product out of the at least one nozzle in an axial direction of the tubular shaped product; and
a propulsion system configured to be supported by the tubular shaped product and to propel the head during discharge of the tubular shaped product.

2. The additive manufacturing system of claim 1, wherein the tubular shaped product is additively manufactured from:
a curable matrix material; and
a solid strand material at least partially encased in the curable matrix material.

3. The additive manufacturing system of claim 2, wherein the head includes at least one curing device configured to cure the curable matrix material in the tubular shaped product as the tubular shaped product discharges from the head.

4. The additive manufacturing system of claim 3, wherein:
the curable matrix material includes a UV curable liquid resin; and
the at least one curing device includes at least one LED.

5. The additive manufacturing system of claim 3, wherein:
the curable matrix material includes a powdered metal; and
the at least one curing device includes an energy source configured to sinter the powdered metal.

6. The additive manufacturing system of claim 1, wherein the propulsion system includes:
a motor; and
at least one gripping device pressed against a wall of the tubular shaped product.

7. The additive manufacturing system of claim 6, wherein the at least one gripping device includes at least one of a wheel, a track, a leg, a screw, a hydraulic pig, a magnet, or a hydraulic inchworm.

8. The additive manufacturing system of claim 1, wherein the propulsion system is configured to be supported inside of the tubular shaped product.

9. The additive manufacturing system of claim 1, further including a hose connecting the propulsion system to the head, wherein the head receives at least one of power, control communications, and materials from the propulsion system via the hose.

10. The additive manufacturing system of claim 1, further including a shaft connecting the head to the propulsion system, wherein the head is rotatable about the shaft relative to the propulsion system.

11. The additive manufacturing system of claim 1, further including a base station connected to at least one of the head and the propulsion system, the base station configured to supply at least one of power, control communications, and material to the least one of the head and the propulsion system.

12. The additive manufacturing system of claim 11, wherein the base station is mobile.

13. The additive manufacturing system of claim 11, wherein:
the head is a first head configured to receive the at least one of power, control communications, and material from the base station; and
the additive manufacturing system further includes a second head configured to receive the at least one of power, control communications, and material from the base station.

14. The additive manufacturing system of claim 11, wherein the base station includes a controller configured to control operation of the head.

15. The additive manufacturing system of claim 14, wherein the:
the head includes a plurality of nozzles arranged around a perimeter; and
the controller is configured to selectively inhibit discharge from at least one of the plurality of nozzles to cause at least one of an access hole and a mesh to be fabricated within the tubular structure.

16. The additive manufacturing system of claim 14, further including at least one of an accelerometer, a gyroscope, a thermometer, and a pressure sensor configured to monitor operation of the head, wherein the controller is configured to control operation of the head based on the monitored operation.

17. The additive manufacturing system of claim 1, wherein:
the head includes a plurality of nozzles arranged around a perimeter; and
at least one of the plurality of nozzles is configured to move relative to the head during discharge and adjust at least one of a diameter and a pattern of the tubular structure.

18. The additive manufacturing system of claim 1, further including at least one rolling module towed by the propulsion system and configured to supply at least one of power, control communications, and material to the least one of the head and the propulsion system.

19. The additive manufacturing system of claim 1, further including an anchor configured to support the propulsion system during start of a new tubular structure.

20. An Additive manufacturing system, comprising:
a head having at least one nozzle configured to discharge a tubular shaped product;
a propulsion system configured to be supported by the tubular shaped product and to propel the head during discharge of the tubular shaped product; and
a base station connected to at least one of the head and the propulsion system, the base station configured to supply at least one of power, control communications, and material to the at least one of the head and the propulsion system,
wherein:
the base station includes a controller configured to control operation of the head;
the head includes a plurality of nozzles arranged around a perimeter; and
the controller is configured to selectively adjust discharge from at least one of the plurality of nozzles to cause the tubular structure to turn away from a current trajectory.

21. An additive manufacturing system, comprising:
a head having at least one nozzle configured to discharge a tubular shaped product out of the at least one nozzle in an axial direction of the tubular shaped product;
at least one gripping device configured to engage a wall of the tubular shaped product and propel the head during discharge; and
a base station connected to the head at a side opposite the at least one gripping device, the base station configured to supply at least one of power, control communications, and material to the head.

* * * * *

UNITED STATES PATENT AND TRADEMARK OFFICE
CERTIFICATE OF CORRECTION

PATENT NO. : 9,808,991 B2  
APPLICATION NO. : 14/810437  
DATED : November 7, 2017  
INVENTOR(S) : Kenneth Tyler Page 1 of 1

It is certified that error appears in the above-identified patent and that said Letters Patent is hereby corrected as shown below:

In the Claims

-In dependent Claim 15, "tubular structure" should read --tubular shaped product--;

-In dependent Claim 17, "tubular structure" should read --tubular shaped product--;

-In dependent Claim 19, "tubular structure" should read --tubular shaped product--; and -In independent Claim 20, "tubular structure" should read --tubular shaped product--.

Signed and Sealed this  
Eleventh Day of September, 2018

Andrei Iancu  
*Director of the United States Patent and Trademark Office*